Nov. 8, 1955 N. WYETH 2,723,006
SHOCK ABSORBER WITH THERMOSTATIC COMPENSATOR
Filed March 30, 1953 2 Sheets-Sheet 1

NATHANIEL WYETH
INVENTOR

BY E.C. McRae
J.R. Faulkner
L.H. Oster
ATTORNEYS

Nov. 8, 1955  N. WYETH  2,723,006
SHOCK ABSORBER WITH THERMOSTATIC COMPENSATOR
Filed March 30, 1953  2 Sheets-Sheet 2

NATHANIEL WYETH
INVENTOR

BY E.C. McRae
J.R. Faulkner
D.H. Oster
ATTORNEYS

United States Patent Office 2,723,006
Patented Nov. 8, 1955

2,723,006

SHOCK ABSORBER WITH THERMOSTATIC COMPENSATOR

Nathaniel Wyeth, Dearborn, Mich., assignor to Ford Motor Company, Dearborn, Mich., a corporation of Delaware Application March 30, 1953, Serial No. 345,612

7 Claims. (Cl. 188—88)

This invention relates generally to hydraulic shock absorbers and refers more particularly to improvements in direct acting shock absorbers for motor vehicles.

An object of the present invention is to provide a hydraulic shock absorber adapted to be connected between sprung and unsprung parts of a motor vehicle and arranged to provide variable damping, particularly during the rebound stroke, in accordance with temperature variations. Direct acting shock absorbers normally utilize a rebound valve controlling a passageway in the piston and arranged to open to permit hydraulic fluid to pass from one end of the cylinder to the other through the piston only after the fluid pressure attains a certain value. This is controlled by spring loading the valve, and the spring loading is predetermined to provide the best compromise for average operating conditions. This compromise, of course, is not ideal for all conditions, and it would be preferable to provide a lesser damping effect and consequently a softer ride for normal city driving at relatively low speeds and for operation upon smooth roads. In addition, it would be preferable to provide a greater damping effect for operation at higher speeds and upon rougher roads since under these conditions vehicle stability is of greater importance. It is accordingly an object of the present invention to achieve these objectives by providing a shock absorber having a variable damping effect more closely approximating the preferred characteristics for the particular conditions encountered.

It has been found that the temperature of the hydraulic fluid within the shock absorber varies within known limits depending not only upon the ambient air temperature but also upon the road conditions encountered and the frequency and amplitude of operation of the shock absorber. For example, the temperature of the hydraulic fluid will be lower when the vehicle is operating at relative low speeds on paved city roads than when operating at higher speeds or upon rougher roads during which time the shock absorber operation is more severe and a greater amount of heat is generated in the fluid. This temperature variation is utilized to actuate a temperature responsive device which in turn varies the spring loading of the rebound valve so as to vary the damping effect in accordance with requirements. A further feature of this type of control resides in the fact that the variation in the viscosity of the fluid due to temperature changes and the resulting variation in the ease of passage of the fluid through the piston passageways is at least partially compensated for by the varied loading of the valve by the temperature responsive device.

Still another object of the invention is to provide a shock absorber in which a restricted passageway is maintained open during normal operations when the fluid temperature is low to provide a softer ride under less extreme operating conditions yet which is automatically closed as the operating conditions become more severe so as to provide the greater damping effect required under these conditions.

Other objects and advantages of this invention will be made more apparent as this description proceeds, particularly when considered in connection with the accompanying drawings, wherein.

Figures 1, 2, 3:
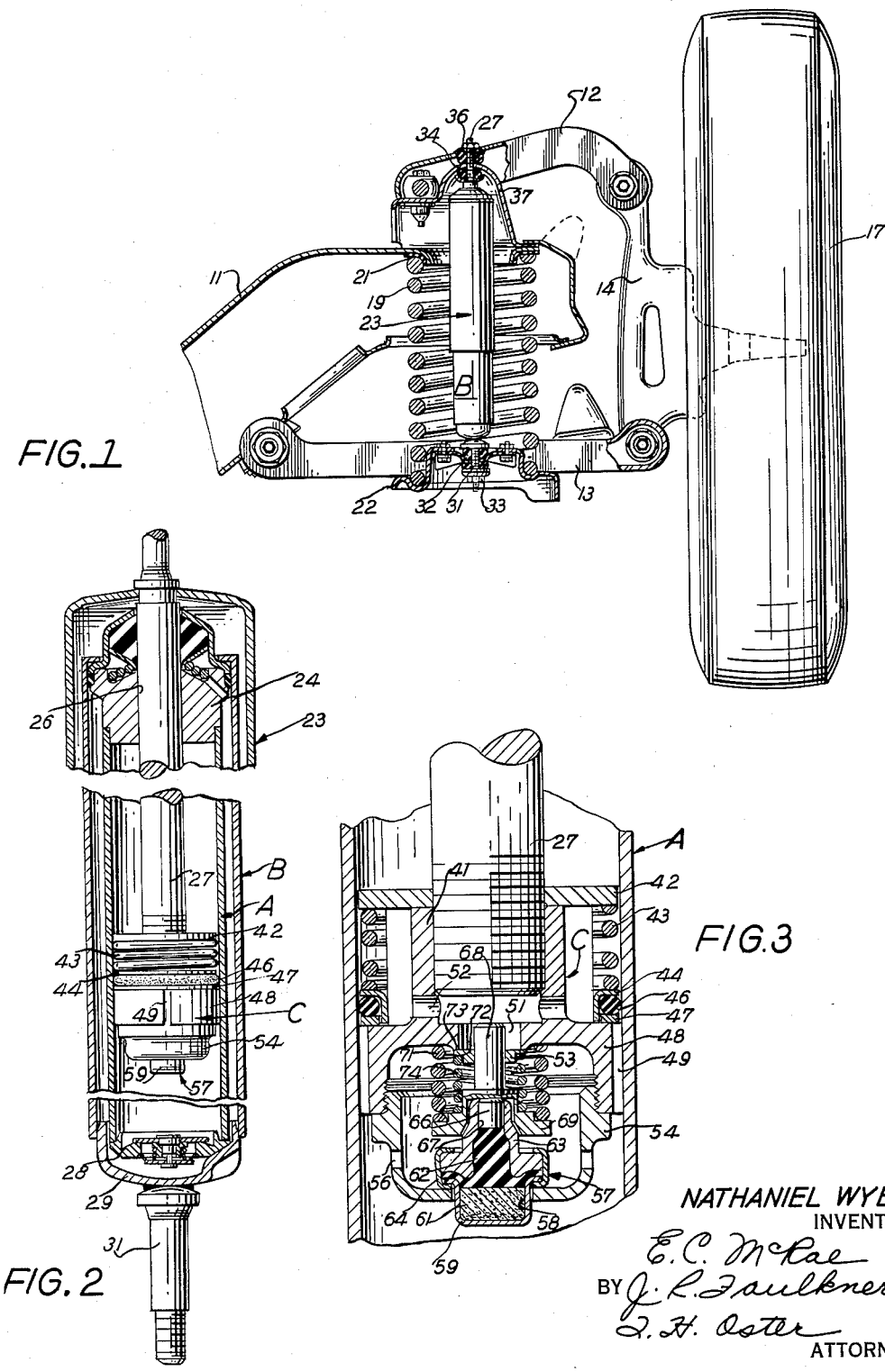
Figure 1 is a transverse cross sectional view through the independent front wheel suspension of a motor vehicle incorporating the present invention.
Figure 2 is an enlarged vertical cross sectional view of the shock absorber shown in Figure 1.
Figure 3 is an enlarged fragmentary cross sectional view of a portion of the shock absorber shown in Figure 2.

Referring now to the drawings, and particularly to Figure 1, there is shown a conventional front wheel suspension for a motor vehicle. The reference character 11 indicates a transverse cross frame member pivotally supporting an upper suspension arm 12 and a lower suspension arm 13. The upper and lower ends of a spindle support 14 are pivotally connected to the outer ends of the upper and lower suspension arms respectively. The wheel spindle 16 rotatably supports a vehicle wheel 17, and a compression coil spring 19 is mounted between a spring seat 21 provided on the frame cross member 11 and a spring pan 22 carried by the lower suspension arm 13. A tubular direct acting shock absorber 23 is also connected between the cross frame member 11 and the spring pan 22.

As best seen in Figure 2, A is the pressure cylinder, B the reserve chamber, and C the piston assembly of the shock absorber 23.

The pressure cylinder A is tubular in form and is provided at its upper end with a guide bushing 24 forming a closure member for the cylinder. The guide bushing 24 has a central bore 26 for slidably receiving the piston rod 27 which in turn carries at its lower end the piston C.

Reserve cylinder B is likewise tubular in form and encircles the pressure cylinder A, providing a chamber therebetween for reserve fluid. At its upper end the reserve cylinder B is supported upon the guide bushing 24.

At their lower ends the pressure cylinder A and reserve cylinder B are joined by interconnected closure members 28 and 29, the latter being welded to the upper end of a short rod 31. Referring again to Figure 1, the rod 31 is attached to the spring pan 22 by means of rubber grommets 32 and a threaded nut 33. The pressure cylinder A is thus attached to the lower suspension arm and hence to the unsprung portion of the wheel suspension.

The upper end of the piston rod 27 extends beyond the upper ends of the cylinders A and B and is attached by means of grommets 34 and a nut 36 to a bracket 37 fixedly mounted upon the cross frame member 11. The piston rod and the piston carried thereby are thus connected to a sprung portion of the vehicle chassis.

Referring now to Figures 2 and 3, the lower end of the piston rod 27 threadedly engages the hub 41 of the piston C. A lock nut 42 is provided to lock the assembly and also to support one end of a coil spring 43, the opposite end of which engages a slidable spring retainer 44 which in turn acts upon a resilient rubber sealing ring 46. The sealing ring 46 rests upon a ring 47 supported upon the upper end of the enlarged body portion 48 of the piston C. The periphery of the body portion 48 of the piston is formed with a plurality of circumferentially spaced elongated grooves 49 providing for the passage of fluid from one end of the cylinder to the other during the compression stroke of the shock absorber. Thus, when the wheel 17 moves upwardly to compress the suspension spring 19, the pressure cylinder A is moved upwardly relative to the piston C and fluid is displaced from the portion of the cylinder below the piston through the peripheral piston grooves 49 to the portion of the cylinder above the piston. At this time the ring 47 and the sealing ring 46 are moved upwardly against the action of spring 43 to permit the fluid transfer. It will be apparent that during the rebound stroke when the pressure cylinder A moves downwardly the pressure built up in the upper portion of the cylinder acts against the spring retainer 44 to compress and expand the resilient sealing ring 46 and close communication through the peripheral grooves 49. This construction is conventional.

The body portion 48 of the piston C is formed with a centrally located axial passageway 51 communicating at its upper end with a transversely extending passageway 52 formed in the hub 41 of the piston and communicating with the upper end of the cylinder. The passageway 51 in the piston is adapted to be closed by a rebound valve 53 arranged to be controlled by certain mechanism to be described more in detail hereinafter so as to be opened during the rebound stroke of the shock absorber when the pressure in the upper portion of the cylinder attains certain value dependent upon the temperature of the fluid within the shock absorber.

The body portion 48 of the piston C supports at its lower end a cup shaped end cap 54 provided with a plurality of openings 56 therethrough for the passage of fluid to and from the lower end of the pressure cylinder A. A temperature responsive device 57 is carried by the end cap 54, projecting through a hole 58 formed in the lower wall of the latter in axial alignment with the passageway 51 in the piston. The temperature responsive device 57 comprises a metal casing or container 59 containing a preformed pellet 61 of thermally expansible material. A plug 62 of a suitable elastomer is placed above the pellet 61 and is clamped between the lower casing 59 and the upper casing 63 by a clamping ring 64. A plunger 66 is slidably mounted in the bore 67 of the upper casing 63 and rests upon the top of the elastomer 62.

The thermally expansible pellet may be formed of copper powder and alkanes or other expansible binder material, compressed under pressure, and expansible in response to increases in temperature. This expansion acts against the plug 62 to force the latter upwardly in the bore 67 and consequently to push the plunger 66 axially upwardly in the upper casing 63.

A valve stem 68 having an enlarged head 69 integrally formed at its lower end is seated upon the upper end of the upper casing 63 of the temperature responsive device 57. The valve stem 68 is axially aligned with the device 57 and with the passage 51 and the upper end of the stem projects into the passageway 51.

Under normal conditions when the temperature to which the pellet 61 is subjected is below a certain predetermined amount the top of the plunger 66 is aligned with the top of the upper casing 63 of the temperature responsive device and pressed against the head 69 of the valve stem. Expansion of the pellet 59 due to temperature increase results in upward movement of the plunger 66 and a corresponding upward movement of the valve stem 68. This movement is resisted by a coil spring 71 mounted between the head 69 of the valve stem and the body portion 48 of the piston, and the spring serves to return the plunger of the temperature responsive device when the temperature again decreases.

The valve 53 is slidably supported upon the valve stem 68 and is formed with an integral flange 72 at its upper end engageable with the valve seat 73 formed on the piston adjacent the passageway 51 thereto. A coil spring 74 of smaller diameter than the coil spring 71 encircles the valve 53 and engages the flange 72 of the valve at its upper end while resting at its lower end upon the head 69 of the valve stem 68. The valve 53 is thus held against the valve seat 73 by the valve spring 74, and closes the passageway 51 through the piston until the fluid pressure in the upper end of the cylinder reaches an amount sufficient to open the valve against the action of spring 74.

The thermally expansible pellet 61 of the temperature responsive device 57 is selected to commence its expansion at a certain predetermined temperature and to complete its full expansion at a second and higher predetermined temperature. When the temperature of the hydraulic fluid surrounding the temperature responsive device 57 is below the temperature required to initiate expansion of the pellet, the parts of the device are as shown in Figure 3 and a preselected minimum damping effect is provided during a rebound stroke of the shock absorber piston and cylinder. This condition will continue when the vehicle is being operated over relatively smooth roads or during city driving when the operation of the shock absorber is less severe and is insufficient to raise the temperature to the level required to expand the pellet. Under more severe driving conditions such as driving over rough roads and at high speeds the resulting increased shock absorber action, both in frequency and in amplitude, will raise the shock absorber fluid temperature and will result in expanding the pellet 61 and in moving the plunger 66 upwardly carrying with it the valve stem 68 and head 69. This action compresses the valve spring 74 and places a greater spring load upon the valve 53, keeping the passageway 51 in the piston closed until the fluid pressure in the upper end of the cylinder reaches a higher value. The resulting greater damping action obtained under these conditions results in stabilizing the suspension and the stability of the vehicle under conditions when such increased stability is desirable. A varied damping action can be thus obtained since the amount of movement of the plunger 66 of the temperature device is dependent upon the temperature to which the device is subjected, thus affording a range of control between predetermined maximum and minimum amounts.

Figure 7:
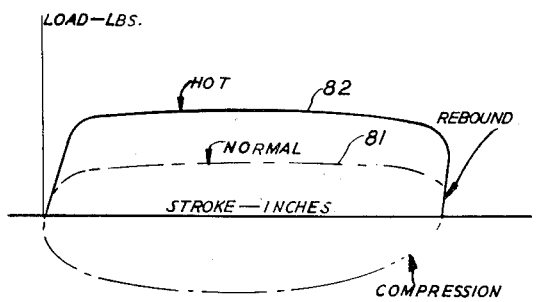
Figure 7 is a graph showing the variable damping effect obtained with the present invention.

The graph shown in Figure 7 is obtained by the testing of a shock absorber incorporating the present invention in a conventional shock absorber testing machine in which the shock absorber piston and cylinder are relatively reciprocated throughout a predetermined stroke and with a certain number of strokes per minute, with the resistance to movement being measured and recorded on a graph to show the cycle pattern obtained under variable temperature conditions. The dot-dash line indicated by the reference character 81 is obtained under normal conditions with the temperature of the hydraulic fluid less than the amount required to actuate the temperature responsive device. It will be noted that during the rebound stroke the load or damping action rises rapidly and then maintains a fair uniform condition to the end of the rebound stroke. The solid line indicated by the reference character 82 represents the load or damping action obtained when the temperature of the shock absorber fluid has been raised to an amount sufficient to obtain full expansion of the temperature responsive device, and it will be seen that a considerably greater damping action is obtained throughout the rebound stroke under these temperature conditions. Since the variable action valve 53 controls only on the rebound passageway 51, the curve for the compression stroke is the same regardless of the temperature of the fluid. Damping action in the range between the curves 81 and 82 is obtained when the temperature is between the predetermined minimum and maximum values within which the temperature responsive device is operative.

Figure 4:
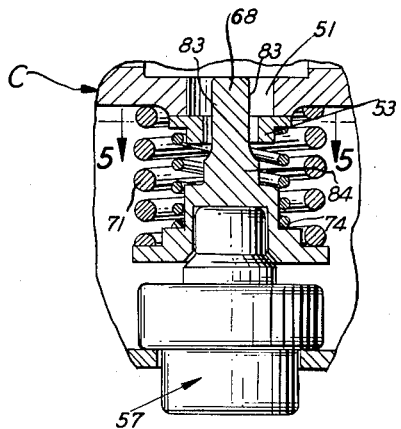
Figure 4 is a cross sectional view similar to Figure 3 but showing a modification thereof.
Figure 5:
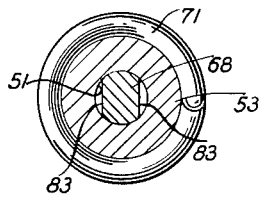
Figure 5 is a transverse cross sectional view taken on the plane indicated by the line 5—5 of Figure 4.

Reference is now made to Figures 4 and 5 which illustrate the modification. The construction shown in this view is generally similar to that shown in Figure 3, with the exception of the construction of the valve stem 68. As best seen in Figure 5, the upper portion of the valve stem 68 is reduced in width by forming two flat sides 83 on opposite sides of the valve stem. The lower portion 84 of the valve stem, however, remains cylindrical and corresponds in diameter to the diameter of the passageway 51 in the piston. It will be seen that with the parts in their normal position as shown, clearance is provided between the flattened portions 83 of the upper portion of the valve stem and the adjacent side wall of the passageway 51 in the piston so that a pair of restricted openings are maintained for the flow of fluid through the piston between the opposite ends of the cylinder. This provides a soft ride which is desirable for boulevard conditions. This would be undesirable, however, for more severe driving conditions and would result in objectionable instability of the vehicle. Under these conditions, however, the shock absorber fluid temperature increases, actuating the temperature responsive device 57 and moving the valve stem 68 upwardly. This not only increases the load upon the valve spring 74 but also moves the valve stem 68 upwardly until the full cylindrical portion 84 thereof is in alignment with the valve 53, thus closing the passageway 51 in the piston and preventing the transfer of fluid from one end of the cylinder to the other except by opening of the rebound valve 53 against the action of the valve spring 74.

Figure 6:
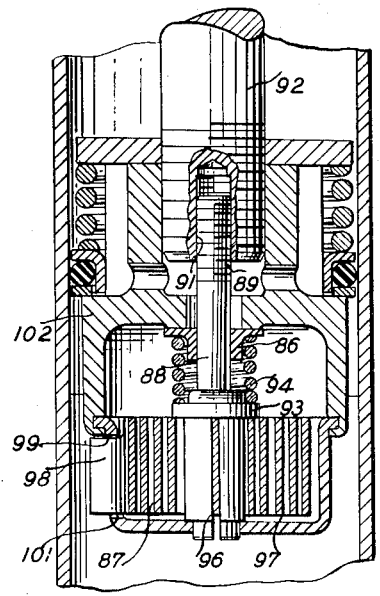
Figure 6 is a cross sectional view similar to Figure 3 but showing another modification.

Figure 6 illustrates another modification in which the rebound valve 86 is controlled by a temperature responsive device 87 of the bimetallic type. The reference character 88 indicates an elongated valve stem having a threaded portion 89 at its upper end received within a tapped hole 91 in the lower end of the piston rod 92. Intermediate its ends the valve stem 88 has an enlarged flange 93 supporting the lower end of the valve spring 94. At its lower end the valve stem is slotted at 96 to receive the inner end of a helical bimetallic element 97, the outer end 98 of which is anchored within a slot 99 formed in the end cap 101 of the piston 102. It will be apparent that an increase in the temperature of the shock absorber fluid will, through the bimetallic element 97, rotate the valve stem 88. Rotation due to an increase in temperature will thread the valve stem upwardly in the threaded opening 91 in the lower end of the piston rod and will compress the valve spring 94, applying a greater load to the rebound valve 86.

Other types of temperature responsive devices may be used to vary the control of the rebound valve, and it is also within the contemplation of the invention to similarly vary the control of the compression stroke of a shock absorber.

It will be understood that the invention is not to be limited to the exact construction shown and described, but that various changes and modifications may be made without departing from the spirit and scope of the invention, as defined in the appended claims.

What is claimed is:

1. A direct acting hydraulic shock absorber for a motor vehicle adapted to be mounted between sprung and unsprung parts of the vehicle, comprising a pressure cylinder attached to one of said parts, a piston reciprocable in said cylinder and attached to the other of said parts, said piston having a passageway therethrough formed with a valve seat, a valve, a temperature responsive device carried by said piston and having a part movable toward said valve upon a temperature increase, and a spring between said valve and said movable part and normally holding said valve against said valve seat.

2. The structure defined by claim 1 which is further characterized in that said valve is mounted in said piston for axial sliding movement toward and away from said valve seat, said temperature responsive device being mounted upon said piston in axial alignment with said valve and having a part movable axially with respect to said piston, and said spring comprising a coil spring positioned between said valve and the axially movable part of said temperature responsive device.

3. A direct acting hydraulic brake shock absorber for a motor vehicle adapted to be mounted between sprung and unsprung parts of the vehicle, comprising a pressure cylinder attached to one of said parts, a piston reciprocable in said cylinder, a piston rod extending from said piston through one end of said cylinder and attached to the other of said parts, said piston having an axial passageway therein arranged to provide communication between the cylinder on opposite sides of the piston, said piston having a valve seat formed therein adjacent said passageway, a valve stem of smaller diameter than said passageway extending concentrically through said passageway and formed with an enlarged head on the side of said piston opposite said piston rod, a valve slidably mounted upon said valve stem and adapted to engage said valve seat to control the transfer of hydraulic fluid through said passageway, a coil spring surrounding said valve stem and having one end engageable with said valve and the opposite end engageable with the head of said valve stem, and a temperature responsive device carried by said piston and engageable with said valve stem to move the latter to vary the load on said spring in accordance with variations in the temperature to which the temperature responsive device is subjected.

4. The structure defined by claim 3 which is further characterized in that said temperature responsive device comprises a container carried by said piston in axial alignment with said valve stem and a moveable plunger engageable with the head of said valve stem, said container having a quantity of material therein expansible when subjected to a temperature rise and acting upon said plunger to move the latter axially toward said valve stem to compress said coil spring and increase the load thereon, and additional spring means acting upon said plunger to move the latter in the opposite direction when the temperature decreases and the material in said container contracts.

5. The structure defined by claim 3 which is further characterized in that said valve stem has an extension projecting through said passageway and threadedly engaging said piston, and said temperature responsive device comprises a bimetallic element having one end connected to said piston and the opposite end connected to said valve stem to induce rotation of the latter as the temperature increases in the direction to thread said valve stem into said piston and increase the load upon said coil spring.

6. The structure defined by claim 3 which is further characterized in that said valve stem and said valve are formed to provide a restricted passage therebetween during normal temperature conditions to permit a restricted flow of hydraulic fluid through said piston at all times under such conditions even though the valve is engaged with said valve seat, and means on said valve stem closing said restricted passage upon a predetermined increase in the temperature to which said temperature responsive device is subjected.

7. The structure defined by claim 3 which is further characterized in that said valve is provided with a cylindrical bore extending axially therethrough to slidably receive said valve stem, said valve having a cylindrical portion corresponding in size to the size of the cylindrical bore in said valve and a reduced portion of smaller size than the size of said bore, said valve stem being normally positioned with its reduced portion extending through the bore in said valve to form a restricted passage therethrough permitting hydraulic fluid to pass through the piston, and said valve stem being movable axially through said valve when said temperature responsive device is subjected to a temperature increase to bring the first mentioned cylindrical portion of said valve stem into alignment with said valve upon a predetermined temperature increase to close the restricted passage through said valve and to permit hydraulic fluid to pass through said piston only when said valve is moved from its valve seat against the action of said coil spring during the rebound stroke of the piston and cylinder.

References Cited in the file of this patent

UNITED STATES PATENTS

| | | |
|---|---|---|
| 1,058,290 | Corey | Apr. 8, 1913 |
| 1,888,920 | Griswold | Nov. 22, 1932 |
| 2,347,803 | Allen et al. | May 2, 1944 |
| 2,396,227 | Beecher | Mar. 12, 1946 |

FOREIGN PATENTS

| | | |
|---|---|---|
| 4,786 | Great Britain | Mar. 27, 1915 |